Patented June 3, 1941

2,243,887

UNITED STATES PATENT OFFICE 2,243,887

TERTIARY CARBINOLS OF THE CYCLO-PENTANO-POLYHYDROPHENANTHRENE SERIES AND A METHOD OF PRODUCING THE SAME

Arthur Serini, Berlin, and Lothar Strassberger, Berlin-Wilmersdorf, Germany, assignors, by mesne assignments, to Schering Corporation, Bloomfield, N. J., a corporation of New Jersey No Drawing. Application November 7, 1936, Serial No. 109,674. In Germany November 9, 1935

31 Claims. (Cl. 260—397.5)

This invention relates to tertiary carbinols of the cyclopentano-polyhydrophenanthrene series which possess on the tertiary carbon atom having a hydroxyl group an unsaturated hydrocarbon residue, and to a method of producing the same.

The process of manufacture of this invention consists in that compounds of the cyclopentano-polyhydrophenanthrene series containing a keto group are brought into reaction with suitable unsaturated metal organic compounds and the reaction products formed split in the known manner by the action of hydrolysing agents.

As compounds of the cyclopentano-polyhydrophenanthrene series containing a keto group there come into consideration for example the saturated and unsaturated androstanolones, such as androsterone, dehydroandrosterone and their various isomers, certain of which, as is well known, have the keto group in the 3-position, and also the follicle hormones containing a keto group and their analogues including hexahydrofollicle hormone.

As unsaturated metal organic compounds are employed suitable unsaturated organic magnesium compounds as are produced for example from magnesium and the halides of acetylene, ethylene, their homologues and also their substitution products, including hydrocarbon-substituted compounds. The metal organic compounds are either allowed to react on the ketone concerned in the finished condition or the process is conducted in such a manner, particularly in the case of unstable metal organic compounds, that the individual reaction components the ketone, the metal and the halide of the unsaturated organic substance, are simultaneously brought into reaction with one another.

If starting materials containing a keto group are employed which in addition also contain a hydroxyl group, then prior to carrying out the present process the free hydroxyl group may be replaced by a group which can easily be reconverted into this group, for example by an ester, ether or halogen group.

The following formulas given by way of example serve to illustrate the process of the invention:

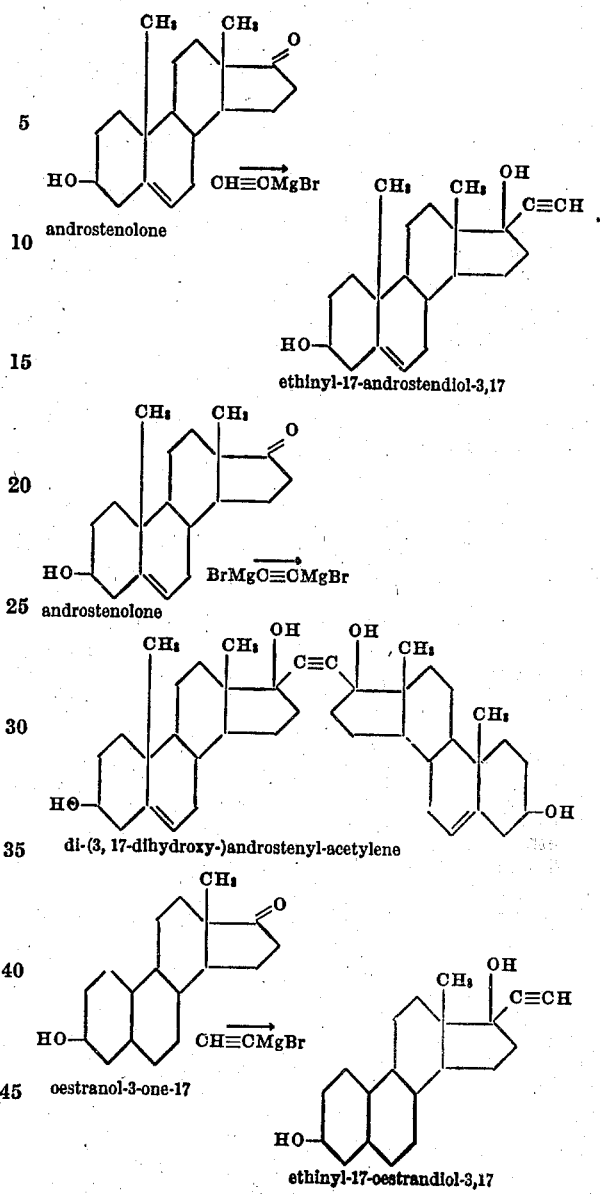

In the first and third of the above examples the H attached to the terminal carbon of the acetylene group may be substituted by a hydrocarbon radical by selecting a corresponding acetylene derivative.

The reaction products are intended to find application as such or as intermediate products for the manufacture of other physiologically valuable substances.

The following examples illustrate the invention:

Example 1

0.7 gram of magnesium, 4.6 grams of bromobenzene and 50 ccs. of ether are heated to gentle boiling for 30 hours with continuous passage of acetylene. There is added thereto with stirring, shaking and continuous passage of acetylene, a solution of 0.5 gram of the acetate of androstenolone in 20 ccs. of ether. After 3 days the reaction mixture is treated with ice water, weakly acidified with dilute sulphuric acid and extracted with ether. After drying and evaporation of the ether, unchanged ketone is removed from the residue by means of semicarbazide and the acetate of the ethinyl-17-androstendiol-3,17 is crystallised from dilute alcohol.

The melting point of the acetate of ethinyl-17-androstendiol-3,17 is 172° C. The rotation amounts to $$[\alpha]_D^{20} = -112°$$

About 0.13 gram of acetate is obtained and in addition about 0.13 gram of semicarbazone of androstenolone-acetate is recovered. The yield amounts therefore to 40%.

If the oily residue does not crystallise of itself it is to be recommended to prepare and separate therefrom with silver nitrate the difficultly soluble silver compound and then to decompose this again with hydrochloric acid and to cause the product to crystallise.

Example 2

3 grams of acetylene-dimagnesium-bromide in 50 ccs. of ether are reacted as in Example 1 with 0.7 gram of acetate of androstenolone. There is obtained on working up, the acetate of the di-(3,17-dihydroxy)-androstenyl-acetylene from dilute methanol. The melting point is 256° C., the yield amounts to about 50%.

Example 3

A solution of 3 grams of androstenolone in 100 ccs. of ether is treated with 5 grams of coppered magnesium, that is, a copper-magnesium alloy in which the magnesium is present in highly active form. Into this solution with slight heating vinyl bromid is passed until the major portion of the magnesium has passed into solution. Then the reaction mixture is poured into ice cold dilute sulphuric acid, taken up in ether, the ethereal solution dried and the ether evaporated. The residue is freed by means of semicarbazide from unchanged ketone and recrystallised from dilute methanol. There is obtained in this manner the vinyl-17-androstendiol-3,17.

Example 4

0.7 gram of magnesium, 4.6 grams of bromobenzene and 50 ccs. of ether are, as stated in Example 1 heated to gentle boiling for 30 hours with continuous passage of acetylene. There is added thereto with stirring, shaking and continuous passage of acetylene a solution of 0.5 gram of oestranol-3-one-17 in 20 ccs. of ether. By working up carried out in a manner analogous to that of Example 1 there is obtained as end product the ethinyl-17-oestrandiol-3,17.

Example 5

To a solution of 10 grams of acetylene-monomagnesium-bromide in 100 ccs. of ether is added a solution of 3 grams of acetyl-androsterone in 20 ccs. of ether. The reaction mixture is heated for a long time to boiling, allowed to stand for 24 hours further and the solution poured into ice cold dilute sulphuric acid. Thereupon the reaction product is extracted with ether and the ether after drying evaporated. By means of semicarbazide solution there is removed from the residue, taken up in alcohol, small quantities of starting material, the solution poured into water and extracted with ether. The residue remaining after evaporation yields on recrystallisation from dilute methanol the acetate of ethinyl-17-androstandiol-3,17.

Of course, various other modifications in the procedure of the process of the present invention may be resorted to within the scope of the appended claims without departing from the principles set forth herein.

What we claim is:

1. Process for the manufacture of tertiary carbinol of the cyclopentano-polyhydrophenanthrene series which possess on the tertiary carbon atom having a hydroxyl group an unsaturated hydrocarbon radical, comprising reacting a compound of the cyclopentano-polyhydrophenanthrene series containing a keto group in one of the 3 and 17 positions, with an unsaturated hydrocarbon-metal derivative in which the metal is directly bound to a carbon atom, and splitting the reaction products formed by the action of a hydrolysing agent.

2. Process for the manufacture of tertiary carbinols of the cyclopentano-polyhydrophenanthrene series which possess on the tertiary carbon atom having a hydroxyl group an unsaturated hydrocarbon radical, comprising reacting androstenol-3-one-17 with an unsaturated hydrocarbon-metal compound in which the metal is directly bound to a carbon atom, and splitting the reaction product with the aid of a hydrolyzing agent.

3. Process for the manufacture of tertiary carbinols of the cyclopentano-polyhydrophenanthrene series which possess an unsaturated hydrocarbon radical on the tertiary carbon atom having the hydroxyl group, comprising reacting a compound of the cyclopentano-polyhydrophenanthrene series containing a keto group in one of the 3 and 17 positions, with an ethinyl-magnesium-halide, and splitting the reaction product with the aid of a hydrolyzing agent.

4. Process for the manufacture of tertiary carbinols of the cyclopentano-polyhydrophenanthrene series which possess an unsaturated hydrocarbon radical on the tertiary carbon atom having the hydroxyl group, comprising reacting a compound of the cyclopentano-polyhydrophenanthrene series containing a keto group in one of the 3 and 17 positions, with a vinyl-magnesium-halide, and splitting the reaction product with the aid of a hydrolyzing agent.

5. Process according to claim 3, wherein the halide is the bromide.

6. Process according to claim 4, wherein the halide is the bromide.

7. Process for the manufacture of tertiary carbinols of the cyclopentano-polyhydrophenanthrene series which possess an unsaturated hydrocarbon radical on the tertiary carbon atom having the hydroxyl group, comprising reacting an androstenol-3-one-17 with an ethinyl-magnesium-halide, and splitting the reaction product with the aid of a hydrolyzing agent.

8. Process for the manufacture of tertiary carbinols of the cyclopentano-polyhydrophenanthrene series which possess on the tertiary carbon atom having a hydroxyl group an unsaturated hydrocarbon radical, comprising reacting a compound of the cyclopentano-polyhydrophenanthrene series having a keto group in one of the 3 and 17 positions and a hydroxyl group in the other of such positions with a reagent capable of replacing the OH group with a group which in turn can be replaced by an OH group with the aid of hydrolysis, reacting the so substituted compound with an unsaturated hydrocarbon-metal compound in which the metal is directly bound to a carbon atom, and splitting the reaction product with the aid of a hydrolyzing agent.

9. Process for the manufacture of tertiary carbinols of the cyclopentano-polyhydrophenanthrene series which possess on the tertiary carbon atom having a hydroxyl group an unsaturated hydrocarbon radical, comprising reacting a compound of the cyclopentano-polyhydrophenanthrene series having a keto group in one of the 3 and 17 positions with an unsaturated hydrocarbon-metal compound in which the metal is directly bound to a carbon atom and which is in statu nascendi, and splitting the reaction product with the aid of a hydrolyzing agent.

10. Carbinols of the cyclopentano-polyhydrophenanthrene series having the general formula $C_{17}H_n(CH_3)(OH)RMX$ wherein $C_{17}H_n$ stands for the sterol nucleus, $n$ being a number of the group consisting of 21 and 23, while the OH group is in the 17-position, R is located at the carbon atom 3 of the sterol nucleus and indicates a member of the class consisting of the hydroxyl group and groups that, upon hydrolysis, can be replaced by a hydroxyl group, M is located at the carbon atom 10 of the sterol nucleus and indicates a member of the group consisting of hydrogen and the methyl group, and X is located at the carbon atom 17 of the sterol nucleus and stands for a member of the group consisting of

and —C≡C—Z, wherein Y and Y' each represent a member of the group consisting of hydrogen and a hydrocarbon radical, while Z stands for a member of the group consisting of hydrogen, a hydrocarbon radical and a sterol radical of the general formula $C_{17}H_n(CH_3)(OH)RM$.

11. Carbinols of the cyclopentano-polyhydrophenanthrene series having the general formula $C_{19}H_{28}ORX$ and the structural formula

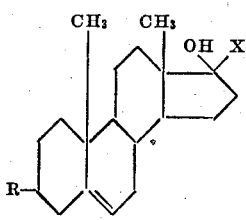

wherein R represents a member of the group consisting of OH, O-acyl, O-alkyl, O-aryl, halogen and any other group that, upon hydrolysis, can be replaced by a hydroxyl group and X stands for a member of the group consisting of

and —C≡C—Z, wherein Y and Y' each represents a member of the group consisting of hydrogen and a hydrocarbon radical, while Z stands for a member of the group consisting of hydrogen, a hydrocarbon radical and a cyclopentanopolyhydrophenanthrene radical of the general formula $C_{19}H_{28}OR$.

12. An ethinyl-17-androstendiol-3.17 compound of the general formula $C_{21}H_{29}OR$ and the structural formula

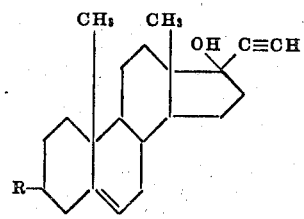

wherein R represents a member of the group consisting of the hydroxyl group and any other group that, upon hydrolysis, can be replaced by the hydroxyl group.

13. A di-(3.17-dihydroxy-)androstenyl-acetylene compound of the general formula $C_{40}H_{56}O_2R_2$ and the structural formula

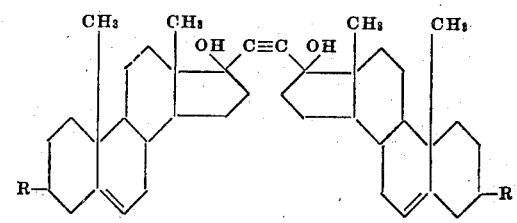

wherein R represents a member of the group consisting of the hydroxyl group and any other group that, upon hydrolysis, can be replaced by the hydroxyl group.

14. An ethinyl-17-oestrandiol-3.17 compound of the general formula $C_{20}H_{29}OR$ and the structural formula

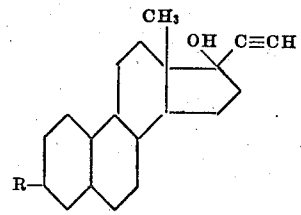

wherein R represents a member of the group consisting of the hydroxyl group and any other group that, upon hydrolysis, can be replaced by the hydroxyl group.

15. Ethinyl-17-androstendiol-3.17 of the general formula $C_{21}H_{30}O_2$ and the structural formula

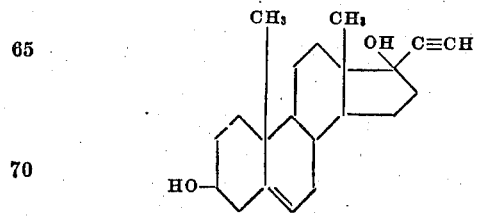

its acetate having a melting point of 172° C. and an optical rotation $$[\alpha]_D^{20°} = -112°$$

16. The hydrolyzed reaction product of a keto-compound of the cyclopentano polyhydrophenanthrene series wherein the keto group is in one of the 3 and 17 positions, and an unsaturated hydrocarbon-metal derivative in which the metal is directly bound to a carbon atom, said product having a tertiary carbinol group at such position.

17. Process for the manufacture of tertiary carbinols of the cyclopentano-polyhydrophenanthrene series which possess an unsaturated hydrocarbon radical on the tertiary carbon atom having the hydroxyl group, comprising reacting a compound of the cyclopentano-polyhydrophenanthrene series containing a keto group in one of the 3 and 17 positions, with a metal derivative of a halide of a member of the group consisting of acetylene, ethylene, and their homologues, the metal of such derivative being directly bound to a carbon atom, and splitting the reaction product with the aid of a hydrolyzing agent.

18. Process for the manufacture of tertiary carbinols of the cyclopentano-polyhydrophenanthrene series which possess an unsaturated hydrocarbon radical on the tertiary carbon atom having the tertiary hydroxyl group, comprising reacting a compound of the cyclopentano-polyhydrophenanthrene series containing a keto group in one of the 3 and 17 positions, with a magnesium derivative of an unsaturated halogen-substituted hydrocarbon in which the magnesium is directly bound to a carbon atom, and splitting the reaction product with the aid of a hydrolyzing agent.

19. Carbinols of the cyclopentano-polyhydrophenanthrene series having the general formula $C_{17}H_n(CH_3)OHRMXZ$, wherein $C_{17}H_n$ stands for the sterol nucleus, $n$ being a number of the group consisting of 21 and 23, while the OH group is in the 17-position, R is located at the carbon atom 3 of the sterol nucleus and indicates a member of the class consisting of the hydroxyl group and groups that, with the aid of hydrolysis, can be replaced by a hydroxyl group, M is located at the carbon atom 10 of the sterol nucleus and indicates a member of the group consisting of hydrogen and the methyl group, X is an unsaturated hydrocarbon residue attached to the 17-carbon atom of the sterol nucleus, and Z stands for a member of the group consisting of hydrogen, a hydrocarbon radical and a sterol radical of the general formula $C_{17}H_n(CH_3)(OH)RM$.

20. A carbinol as defined in claim 19, wherein Z is hydrogen.

21. A carbinol as defined in claim 19, wherein Z is a sterol radical of the general formula $$C_{17}H_n(CH_3)(OH)RM$$

22. Process for the manufacture of tertiary carbinols of the cyclopentano-polyhydrophenanthrene series which possess on the tertiary carbon atom having a hydroxyl group an unsaturated hydrocarbon radical, comprising reacting androstenol-3-one-17 wherein the OH group has been replaced with a group which in turn can be replaced by the hydroxyl group with the aid of hydrolysis, with an unsaturated hydrocarbon-metal compound in which the metal is directly bound to a carbon atom, and splitting the reaction product with the aid of a hydrolyzing agent.

23. Process for the manufacture of tertiary carbinols of the cyclopentano-polyhydrophenanthrene series which possess on the tertiary carbon atom having a hydroxyl group an unsaturated hydrocarbon radical, comprising reacting an androstenol-3-one-17 compound in which the substituent in the 3-position is a member of the group consisting of hydroxyl and groups which with the aid of hydrolysis can be replaced by hydroxyl, with an unsaturated hydrocarbon-metal compound in which the metal is directly bound to a carbon atom and which is in statu nascendi, and splitting the reaction product with the aid of a hydrolyzing agent.

24. An ethinyl androstendiol compound of the general formula $C_{21}H_{29}OR$ and the structural formula

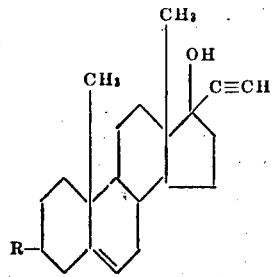

wherein R stands for a member of the class consisting of the hydroxyl group and groups that on hydrolysis, can be replaced by a hydroxyl group.

25. A cyclopentano polyhydro phenanthrene compound having the tertiary alcohol group

in the 17 position, Y being an aliphatic hydrocarbon radical including two carbon atoms joined by a multiple bond, one of such carbons being connected directly to the nuclear carbon.

26. An androstenol compound having the tertiary alcohol group

in the 17-position, Y being an aliphatic hydrocarbon radical including two carbon atoms joined by a multiple bond, one of such carbons being connected directly to the nuclear carbon.

27. A 10,13-dimethyl cyclopentano polyhydro phenanthrene compound having a hydroxyl group and an unsaturated aliphatic hydrocarbon group of at least two carbon atoms attached to a common tertiary carbon atom at the 17-position, the $\beta$-carbon of the hydrocarbon group being connected to an adjacent carbon through a multiple bond.

28. A tertiary alcohol comprising the addition product of a 17-keto cyclopentano polyhydro phenanthrene compound and an unsaturated hydrocarbon of the group consisting of acetylenes and ethylenes, the tertiary 17-carbon being directly connected to one of the unsaturated carbons of the hydrocarbon.

29. A 13-methyl cyclopentano polyhydro phenanthrene compound having the tertiary alcohol group

in the 17 position, Y being an aliphatic hydrocarbon radical including two carbon atoms joined by a multiple bond, one of such carbons being connected directly to the nuclear carbon.

30. A cyclopentano polyhydro phenanthrene compound having the tertiary alcohol group

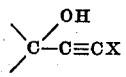

in one of the 3 and 17 positions, X being a member of the group consisting of hydrogen and hydrocarbon radicals.

31. In a method of producing tertiary alcohols of the cyclopentano polyhydro phenanthrene series, wherein the tertiary carbon is situated in the nucleus, the step which comprises causing a member of the group consisting of acetylene and hydrocarbon-substituted acetylenes capable of combining with keto groups to react on a compound of the cyclopentano polyhydro phenanthrene series containing a keto group in one of the 3 and 17 positions.

ARTHUR SERINI.
LOTHAR STRASSBERGER.